United States Patent
Zimmer et al.

(10) Patent No.: US 7,421,431 B2
(45) Date of Patent: Sep. 2, 2008

(54) PROVIDING ACCESS TO SYSTEM MANAGEMENT INFORMATION

(75) Inventors: Vincent J. Zimmer, Federal Way, WA (US); Michael A. Rothman, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 1205 days.

(21) Appl. No.: 10/327,192

(22) Filed: Dec. 20, 2002

(65) Prior Publication Data

US 2004/0123090 A1    Jun. 24, 2004

(51) Int. Cl.
    *G06F 7/00* (2006.01)
(52) U.S. Cl. .................................. 707/8; 710/260
(58) Field of Classification Search .............. 707/8; 710/200, 260
    See application file for complete search history.

(56) References Cited

U.S. PATENT DOCUMENTS

| | | | |
|---|---|---|---|
| 5,276,888 A * | 1/1994 | Kardach et al. | 710/261 |
| 5,339,437 A | 8/1994 | Yuen | 395/700 |
| 5,511,204 A * | 4/1996 | Crump et al. | 713/330 |
| 5,530,804 A * | 6/1996 | Edgington et al. | 714/30 |
| 5,682,310 A * | 10/1997 | Pedneau et al. | 710/261 |
| 5,684,997 A * | 11/1997 | Kau et al. | 710/260 |
| 5,754,798 A * | 5/1998 | Uehara et al. | 710/104 |
| 5,764,999 A | 6/1998 | Wilcox et al. | 395/734 |
| 5,978,903 A * | 11/1999 | Quimby et al. | 712/229 |
| 6,065,125 A * | 5/2000 | Shiell et al. | 713/330 |
| 6,093,213 A * | 7/2000 | Favor et al. | 703/27 |
| 6,112,312 A * | 8/2000 | Parker et al. | 714/32 |
| 6,317,798 B1 * | 11/2001 | Graf | 710/15 |
| 6,321,289 B1 | 11/2001 | Engfer et al. | 710/260 |
| 6,343,338 B1 | 1/2002 | Reneris | 710/200 |
| 6,442,635 B1 | 8/2002 | Brightman et al. | 710/268 |
| 6,446,153 B2 | 9/2002 | Cooper et al. | 710/260 |
| 6,453,278 B1 | 9/2002 | Favor et al. | 703/27 |
| 6,584,586 B1 * | 6/2003 | McCoy | 714/45 |
| 6,862,641 B1 * | 3/2005 | Strongin et al. | 710/260 |
| 2002/0004815 A1 * | 1/2002 | Muhlestein et al. | 709/201 |
| 2003/0169264 A1 * | 9/2003 | Emerson et al. | 345/547 |

* cited by examiner

*Primary Examiner*—Wilson Lee
*Assistant Examiner*—Michael Le
(74) *Attorney, Agent, or Firm*—Trop, Pruner & Hu, P.C.

(57) ABSTRACT

System management information may be obtained from multiple input devices associated with system management mode drivers during pre-boot and during runtime of an operating system. The system management information may be converted to a form for presentation management and stored in an indexed database accessible during runtime. A lock provides mutually exclusive access to the stored system management information for either updating or display.

20 Claims, 3 Drawing Sheets

PROVIDING ACCESS TO SYSTEM MANAGEMENT INFORMATION

BACKGROUND

This invention relates generally to accessing system management information for a processor-based system and, more particularly, to providing seamless access to system management information in a foreground operating system.

In modern computer systems, system management activities such as those associated with temperature, voltage, and front panel button monitoring may be performed by routines that operate transparently to the operating system. One example of such a mode is termed System Management Mode (SMM) and may be entered through activation of an external system interrupt pin which generates a System Management Interrupt (SMI). Similarly, an Inter-Processor Interrupt (IPI) message may be delivered or generated by the integrated Advanced Programmable Interrupt Controller (APIC). In response to an SMI, the SMM may handle the event with system management functions such as reduced power consumption, debugging, or hardware emulation. Another example is an Itanium processor that may be accessed through a pin that provides a Platform Management Interrupt (PMI) signal, and an interrupt message that may be delivered through the Streamline Advanced Programmable Interrupt Controller (SAPIC).

System management functions may be performed independently of the operating system. Before handling a system management event, the processor's entire operating state or internal state may be saved to a separate, protected and dedicated memory space which may be referred to as SMM Random Access Memory (RAM). Then, the computer system's firmware, instead of application programs or the operating system's software, may control product-specific hardware features.

A system management handler may determine what system management event occurred and take appropriate action. For example, if the event was a reading from a temperature sensor exceeding a specified value, the appropriate action may be to suspend operation of one or more non-essential devices or components. The handler also may modify one or more hardware registers and/or system memory locations to indicate the occurrence of the event. The handler may commence execution in real mode, and may transition into protected mode, during which the processor executes out of a separate address space. In other processor-based systems, including the Itanium architecture, the processor may execute in physical mode.

In the past, to obtain information about the occurrence of system management events, applications could poll the operating system. On expiration of an application specific timer, the system management application could initiate a query to examine the hardware registers and/or system memory locations that the handler modified. If the handler indicated a change relevant to the initiating application, this information was returned to the querying application and processing continued. If the handler did not indicate a change relevant to the initiating application, normal processing continues. However, this approach had several disadvantages including wasted processor time and a lack of synchronization between the event and the action.

It has been cumbersome and difficult to access or view system management information in live or real time during the pre-boot as well as in the runtime environment. For example, system management information obtained during pre-boot may not be conveyed to the operating system. For example, in the past, drivers in SMM have used back-channel communications, such as out-of-band serial ports or network, as a console. Conveying system management information to the operating system involved a kernel-mode driver to driver/firmware call. Or, SMM drivers logged information to persistent store, such as flash memory, that could be accessed on a subsequent restart in protected mode.

There is a need to provide live system management data, which can include alerting, status, etc., to the user during the pre-boot and in a runtime environment. There is a need for system management data obtained during pre-boot to be accessed during runtime of an operating system. There is a need for system management data to be readily accessible by a user through the operating system, for example to determine what system management event occurred, such as platform errors, thermal events, and other platform exceptions, and/or what actions the responding handler has taken.

DETAILED DESCRIPTION

Figure 1:
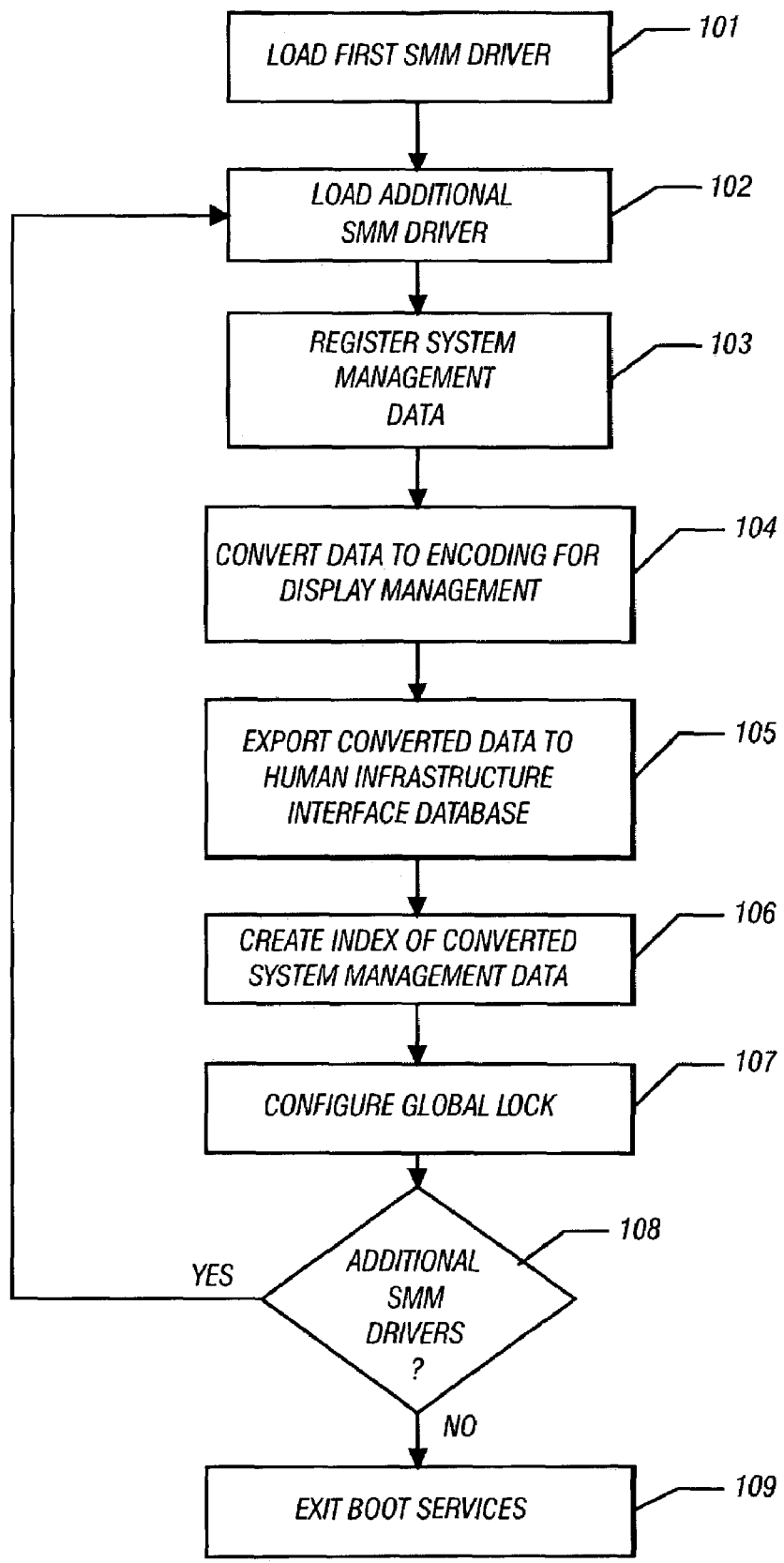
FIG. 1 is a schematic flowchart showing an embodiment of the invention in the pre-boot environment.

FIG. 1 is a schematic flowchart showing one embodiment of the invention in a pre-boot environment. The embodiment may be implemented in software and/or firmware in a processor-based system that loads or boots an operating system and then passes control to the operating system. A boot manager may receive execution control once it is placed on the system's hard drive or other accessible storage media.

The embodiment of the invention shown and described in FIG. 1 may be adapted for use in processor based systems that have as one possible operating mode the System Management Mode (SMM). For example, SMM is available in the Intel processor architecture, and the same or similar modes may be available in other processor architectures. In general, a processor-based system should provide or be capable of providing at least one operating mode to handle system management functions outside of and/or transparent to the normal operating mode.

In a pre-boot environment, for example, a 32-bit Intel processor-based system (IA-32), may attempt to locate a device with bootstrap code such as a floppy disk, CD-ROM or fixed disk. Once a bootable device is found, a series of disk calls are made to find an active storage partition with a boot sector. Executable code in the boot sector locates a secondary bootstrap loader that loads an operating system. A 64-bit Intel processor-based system (IA-64), may store boot information in non-volatile random access memory (NVRAM), or firmware. The firmware settings may be controlled by the Extensible Firmware Interface (EFI) or other firmware.

In one embodiment, as shown in FIG. 1, a first or base SMM driver is loaded into RAM in block 101. During pre-boot, the first or base SMM driver, which also may be referred to as a main or primary SMM driver, or an SMM manager, provides machine readable software or firmware with instructions directing the identification of additional SMM drivers. In this embodiment, the firmware of the processor-based system allows for loading one or multiple drivers into SMM. These drivers may be PE32+ images that run in protected mode and are hosted by an SMM dispatcher and core.

In block 102, according to one embodiment, an additional or secondary SMM driver is loaded into RAM. Each additional or secondary SMM driver provides a machine readable software or firmware program having instructions that control one or more input devices for system management information. For example, a secondary SMM driver may be a device specific control program that enables a processor-based system to receive input from a specific device such as a thermal sensor.

In block 103, in one embodiment of the invention, system management data obtained during pre-boot from the input device and associated SMM driver is registered and/or loaded into random access memory (RAM). For example, in the case of an SMM driver for a thermal sensor, initial temperature data may be registered. Alternatively, system management data may be registered or loaded if it exceeds a specified value or meets an exception condition.

In one embodiment, as shown in block 104, data from the input device and associated SMM driver is converted to a binary encoding that allows for display or presentation management of the system management data by an operating system or browser such as XML or HTML. For example, binary encoding may include a text string such as: "The current temperature is: XXX degrees Fahrenheit." The system related-data, i.e., the temperature reading from an SMM driver for the thermal sensor, may be converted into a form that is a self-describing mechanism for a user interface in the pre-boot and runtime that can render pages. In one embodiment, the data may be converted into a series of questions and answers. For example, the encoding may include but is not limited to one or more questions or prompts which are text strings identifying or describing the specified system management information, a variable or value for each piece of system management data from the SMM driver, and the time of the data observation. Thus, the conversion of the system management event to the binary encoding allows system management events from multiple drivers, including system management information obtained during pre-boot, to be displayed in a user friendly format during runtime of an operating system.

In one embodiment, the binary encoding of system management information from each SMM driver is referred to as a byte-stream that may be referred to as Internal Form Representation (IFR). The IFR version of system management data allows various presentation management agents, or setup programs, to render pages describing the system management data from multiple drivers in the pre-boot and runtime environments. Self-describing binary encoding may be used to define the questions and data.

In block 105, according to one embodiment, the converted system management data from the SMM driver is exported to a non-volatile database or mailbox, which is referred to here as the Human Infrastructure Interface (HII). The HII database stores the system management information from each SMM driver after the data is converted to a form that may be accessed by and displayed to the user both during pre-boot and during runtime.

In block 106, according to one embodiment, an index may be created of all converted system management data from the SMM drivers that was exported and saved in the HII database. The index may be placed in a runtime memory buffer, or platform buffer, that is accessible by an operating system during runtime. Each index entry may be a multiple of a pointer to the beginning of a set or package of converted data from each SMM driver, and a pointer to the string title associated with that collection of data. The pointers are relative offsets from the beginning of the table. The configuration table may be updated with an identifier (here referred to as a Globally Unique Identifier (GUID)) and pointer pair to allow runtime entities, i.e., browsers or other user-directed inquiries, to find the memory buffer. The location of the converted data from the secondary SMM driver within the GUID/pointer pair set location may be cached.

In block 107, in one embodiment, a global lock is configured for the converted system management data associated with each secondary SMM driver. The global lock permits mutually exclusive access to the specified system management data by either an SMM driver (i.e., to update the information), or the user (i.e., to view the specified system management data through an operating system or browser). Fields on the lock may specify if an update is in progress as a result of additional data from the SMM driver, or if a presentation is in progress by the viewer. Thus, the lock allows collaboration between the foreground operating system browser and the SMM drivers. For example, the global lock may comprise a GUID/Pointer pair identified as IFR_GLOBAL_LOCK, a field for access by the SMM driver may be identified as UPDATE_IN_PROGRESS, and a field for access by the user may be identified as PRESENTATION_IN_PROGRESS.

In one embodiment, block 108 checks if there are additional SMM drivers that have not been loaded. If additional unloaded SMM drivers exist, return to block 102 and blocks 102 through 108 are repeated. If all SMM drivers are loaded, in block 109, boot services is exited and an operating system may be loaded. In principle, the ExitBootServices call is intended for use by the operating system to indicate that its loader is ready to assume control of the platform and all platform resource management. Thus, boot services are available up to this point to assist the operating system loader in preparing to boot the operating system. Once the operating system loader takes control of the system and completes the operating system boot process, only runtime services may be called.

Figure 2:
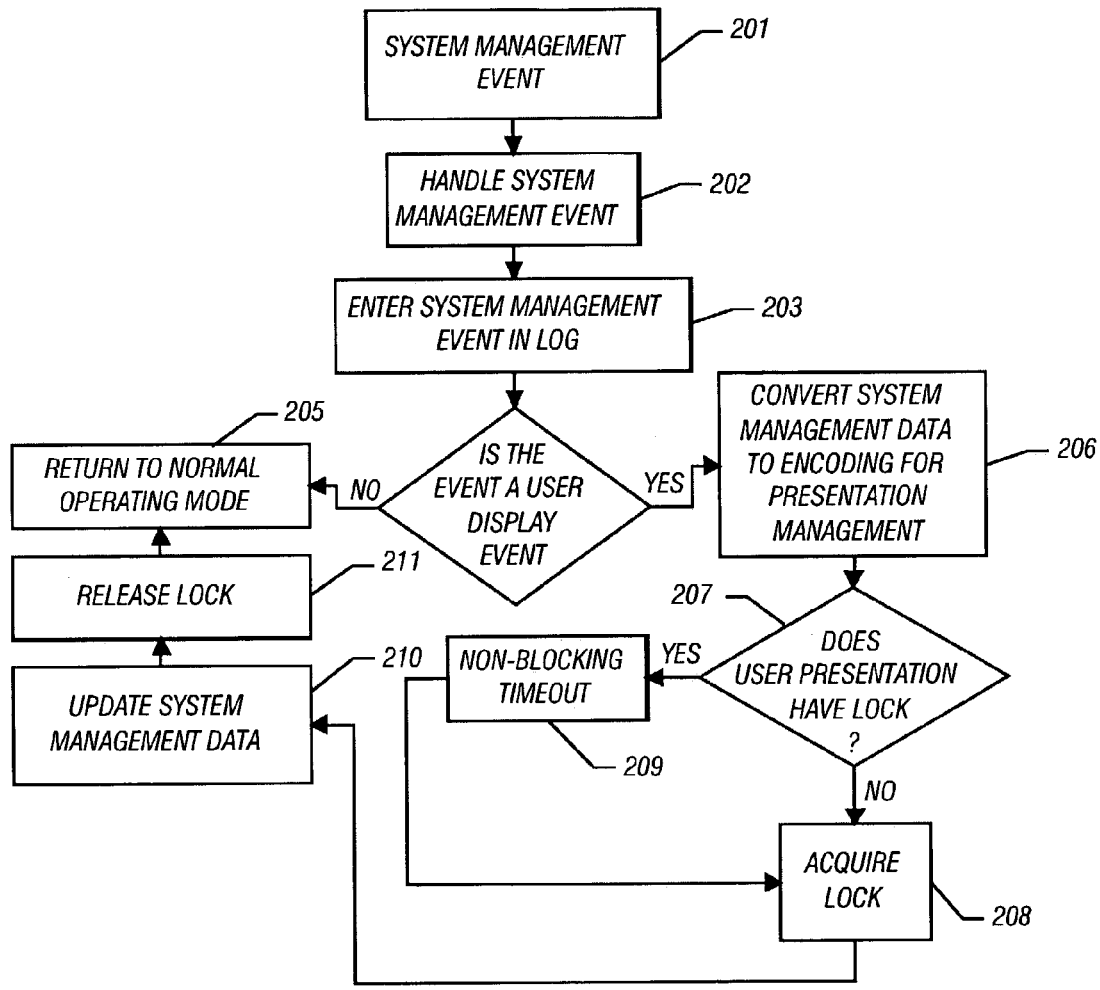
FIG. 2 is a schematic flowchart showing an embodiment of the invention in the runtime environment.

FIG. 2 is a schematic flowchart of an embodiment of the invention shown during runtime of an operating system, in which a system management event, i.e., an event causing an SMI, is handled. In this embodiment, a processor based system may be executing in protected mode during runtime before a system management event occurs.

In block 201, according to a first embodiment, a system management event occurs. In this block, the operating system may be suspended, the current state of the processor may be saved, and the processor switched to SMM. Illustrative system management events include but are not limited to the detection of computer system voltages outside a specified range, a thermal trip event in which temperatures fall outside a specified range, activation of one or more front panel buttons, opening of the computer system chassis, or the insertion of a new device card. In one embodiment, the system management event triggers an SMI signal to a processor-based system.

In one embodiment of the invention, as shown in block 202, the detected system management event may be handled by a system management handler. For example, the system management handler may shut off power to all non-essential components.

In block 203, according to one embodiment, the system management event may be entered in a system event log listing detected system management events, and stored in a database with system management information stored during pre-boot and/or runtime from that SMM driver.

In block 204, according to one embodiment, it is determined whether or not the system management event is a user display event. In one embodiment, system management firmware may specify which system management events are to be user display events. For example, system management events may be only those events that are subject to change during pre-boot or runtime. Optionally, in one embodiment, the determination and selection of which system management events are user display events may be changed or revised during pre-boot and/or runtime.

In one embodiment, as shown in block 205, if the event is not a user display event, the processor returns to the normal operating mode, i.e., protected mode, that it was in before the system management event occurred.

In block 206, according to one embodiment, if the system management event from the secondary SMM driver is designated as a user display event, the system management data from that driver is converted to a binary encoding that allows for display or presentation management by an operating system or browser such as XML or HTML. This form provides a self-describing mechanism for a user interface, such as a series of questions or prompts for answers.

In block 207, according to one embodiment, it is determined if the user presentation has a global lock. If the user presentation has the lock (i.e., there is a presentation in progress through the operating system), there will be a wait to obtain the lock. If the user presentation does not have the lock, the system management update acquires the lock in block 208.

In block 210, according to one embodiment, the appropriate page is updated with new system management data from the secondary SMM driver, such as the temperature information that generated the SMI. Thus, the additional system management data from the SMM driver is added or supplemented to the appropriate page storing data from that driver. Once the converted system management data is in the database, the user may choose to read the contents to obtain system management information acquired by the system. The user also may choose to clear the log, read a previous log, or send the system management information to a non-volatile storage medium.

In block 209, in one embodiment of the invention, if the user presentation has the global lock, a non-blocking timeout occurs while the specified system management data is displayed in the operating system environment. During the timeout, fields on the lock may specify that a presentation is in progress by the viewer. For example, a field specifying access of the global lock by the user may be identified as PRESENTATION_IN_PROGRESS. The stored system management information may not be updated with the new system management information from the driver until the global lock is obtained after the user presentation concludes. A timer in the chipset may be implemented in hardware or software to provide a specified time value for the non-blocking timeout.

In one embodiment, for the operating system to obtain access to the system management data, the browser may do an exchange add or other atomic instruction (either the operation is uninterruptible or, if it is aborted, a mechanism exists to ensure the return of the system to its state prior to initiation of the instruction) against the lock. It will busy-wait if a system management update is in progress and then acquire the lock when it commences parsing the converted system management data that was cached. Optionally, according to one embodiment of the invention, upon loading of an operating system, a program may ascertain the location of the GUID/Pointer pair and provide access to the system management information.

In block 211, according to one embodiment, the system management update releases the lock. Then, in block 205, the Resume instruction may be generated to cause the processor to exit SMM and return to its previous operating mode before the system management event.

Embodiments may be implemented in a computer program or in firmware. As such, these embodiments may be stored on a storage medium having stored thereon instructions which can be used to program a computer system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories, (RAMs), erasable programmable read-only memories (EPROMs), electrically erasable programmable read-only memories (EEPROMs), magnetic or optical cards, or any type of media suitable for storing electronic instructions. Similarly, embodiments may be implemented as software modules executed by a programmable control device. A programmable control device may be a computer processor or a custom designed state machine. Custom designed state machines may be embodied in a hardware device such as a printed circuit board having discrete logic, integrated circuits, or specially designed application specific integrated circuits (ASICs).

Figure 3:
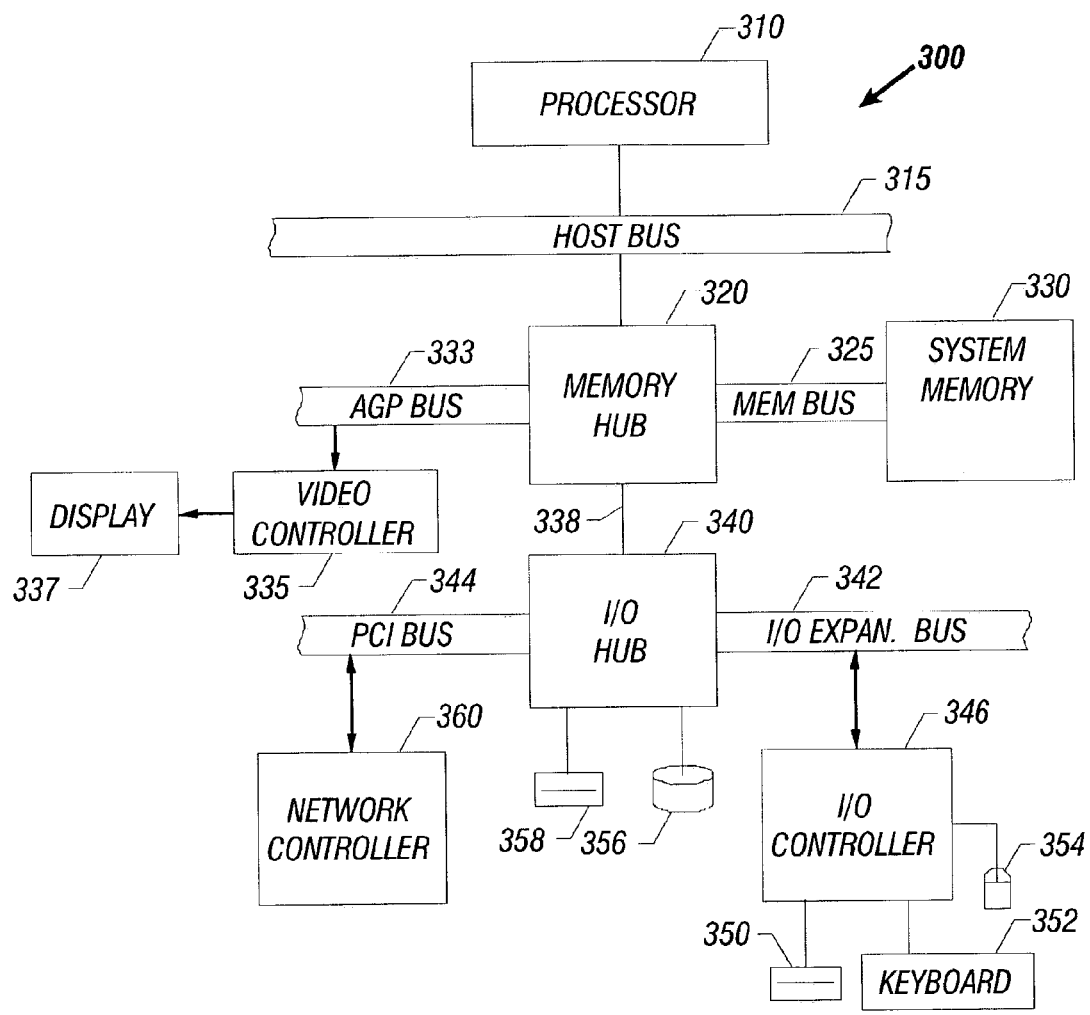
FIG. 3 is a block diagram of a processor based system in accordance with one embodiment of the invention.

Example embodiments may be implemented in software for execution by a suitable data processing system configured with a suitable combination of hardware devices. FIG. 3 is a block diagram of a representative data processing system, namely computer system 300 with which embodiments of the invention may be used.

Now referring to FIG. 3, in one embodiment, computer system 300 includes processor 310, which may include a general-purpose or special-purpose processor such as a microprocessor, microcontroller, ASIC, a programmable gate array (PGA), and the like. As used herein, the term "computer system" may refer to any type of processor-based system, such as a desktop computer, a server computer, a laptop computer, an appliance or set-top box, or the like.

Processor 310 may be coupled over host bus 315 to memory hub 320 in one embodiment, which may be coupled to system memory 330 via memory bus 325. Memory hub 320 may also be coupled over Advanced Graphics Port (AGP) bus 333 to video controller 335, which may be coupled to display 337. AGP bus 333 may conform to the Accelerated Graphics Port Interface Specification, Revision 2.0, published May 4, 1998, by Intel Corporation, Santa Clara, Calif.

Memory hub 320 may also be coupled (via hub link 338) to input/output (I/O) hub 340 that is coupled to input/output (I/O) expansion bus 342 and Peripheral Component Interconnect (PCI) bus 344, as defined by the PCI Local Bus Specification, Production Version, Revision 2.1, dated in June 1995. I/O expansion bus 342 may be coupled to I/O controller 346 that controls access to one or more I/O devices. As shown in FIG. 3, these devices may include in one embodiment storage devices, such as keyboard 352 and mouse 354. I/O hub 340 may also be coupled to, for example, hard disk drive 356 and compact disc (CD) drive 358, as shown in FIG. 3. It is to be understood that other storage media may also be included in the system.

In an alternative embodiment, I/O controller 346 may be integrated into I/O hub 340, as may other control functions. PCI bus 344 may also be coupled to various components including, for example, network controller 360 that is coupled to a network port (not shown).

Additional devices may be coupled to I/O expansion bus 342 and PCI bus 344, such as an input/output control circuit coupled to a parallel port, serial port, a non-volatile memory, and the like.

Although the description makes reference to specific components of system 300, it is contemplated that numerous modifications and variations of the described and illustrated embodiments may be possible. For example, instead of memory and I/O hubs, a host bridge controller and system bridge controller may provide equivalent functions. In addition, any of a number of bus protocols may be implemented.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A method comprising:
    registering data regarding operating parameter information of a processor-based system obtained in a system management mode in the processor-based system;
    converting the data in the processor-based system to an encoding for a user visible display; and
    exporting the convened data to a database of the processor-based system for display in the processor-based system in an operating mode other than system management mode.

2. The method of claim 1, further comprising creating an index of the convened data in a buffer accessible during runtime of an operating system.

3. The method of claim 2, further comprising updating the index upon registration of additional data.

4. The method of claim 1, further comprising booting an operating system onto the processor-based system and displaying the converted data during runtime of the operating system.

5. The method of claim 4, further comprising updating the converted data during runtime of the operating system.

6. The method of claim 4, further comprising preventing updating of the converted data during displaying of the converted data during runtime of the operating system via a lock.

7. The method of claim 4, further comprising registering the data obtained in the system management mode before booting the operating system.

8. The method of claim 7, further comprising converting the registered data before booting the operating system.

9. The method of claim 4, further comprising exporting the converted data before booting the operating system.

10. The method of claim 1, wherein the encoding for the user visible display comprises a text string.

11. The method of claim 1, further comprising providing a self-describing mechanism to enable a user interface to query the user for information based on the user visible display.

12. A system comprising:
    a processor operable in a first mode configured to boot an operating system to run on the processor and a second mode to handle system management events;
    an input device to provide system management information to the processor regarding system management events both before and after the operating system is booted; and
    code to convert the system management information to a form for user visible display in the system.

13. The system of claim 12, further comprising an index of the converted system management information.

14. The system of claim 12, further comprising a lock configured to restrict an update to the system management information during the user visible display in a runtime of the operating system.

15. An article comprising a machine-readable storage medium containing instructions that if executed enable a system to:
    receive a system management interrupt signal and system management data associated with a system management event;
    determine if the system management event is a display event; and
    if the system management event is a display event convert the system management data to an encoding for user visible display.

16. The article of claim 15, further comprising instructions that if executed enable the system to display the encoded system management data.

17. The article of claim 15, further comprising instructions that if executed enable the system to wait for completion of the user visible display before updating the system management data.

18. The article of claim 15, further comprising instructions that if executed enable the system to block the user visible display while the system management data is being stored.

19. The article of claim 15, further comprising instructions that if executed enable the system to store the system management data obtained before booting an operating system and display the system management data during runtime of the operating system.

20. The article of claim 19, further comprising instructions that if executed enable the system to create an index of the system management data in a buffer accessible during the runtime of the operating system.

* * * * *

UNITED STATES PATENT AND TRADEMARK OFFICE
CERTIFICATE OF CORRECTION

| | | |
|---|---|---|
| PATENT NO. | : 7,421,431 B2 | Page 1 of 1 |
| APPLICATION NO. | : 10/327192 | |
| DATED | : September 2, 2008 | |
| INVENTOR(S) | : Vincenter J. Zimmer and Michael A. Rothman | |

It is certified that error appears in the above-identified patent and that said Letters Patent is hereby corrected as shown below:

Title Page, Item (54) Title & Col. 1, Line 1
"PROVIDING ACCESS TO SYSTEM MANAGEMENT INFORMATION" should be --SYSTEM AND METHOD FOR CONVERTING SYSTEM MANAGEMENT DATA TO BE VIEWED AND UPDATED BEFORE OR DURING RUNTIME OF AN OPERATING SYSTEM--;

Column 7:
Line 21, "convened" should be --converted--;
Line 26, "convened" should be --converted--.

Signed and Sealed this

Tenth Day of March, 2009

JOHN DOLL
*Acting Director of the United States Patent and Trademark Office*